United States Patent
Haderer et al.

(10) Patent No.: US 9,327,362 B2
(45) Date of Patent: May 3, 2016

(54) METHOD FOR POSITIONING A WELDING HEAD BY MEANS OF MICROWAVES

(75) Inventors: Andreas Haderer, Ried in der Riedmark (AT); Andreas Stelzer, Linz (AT)

(73) Assignee: Fronius International GmbH, Pettenbach (AT)

(*) Notice: Subject to any disclaimer, the term of this patent is extended or adjusted under 35 U.S.C. 154(b) by 252 days.

(21) Appl. No.: 13/879,888

(22) PCT Filed: May 11, 2012

(86) PCT No.: PCT/AT2012/000133
§ 371 (c)(1),
(2), (4) Date: Apr. 17, 2013

(87) PCT Pub. No.: WO2012/151597
PCT Pub. Date: Nov. 15, 2012

(65) Prior Publication Data
US 2013/0204434 A1    Aug. 8, 2013

(30) Foreign Application Priority Data
May 12, 2011 (AT) .................................. A 676/2011

(51) Int. Cl.
*G05B 19/04*  (2006.01)
*B23K 9/095*  (2006.01)
(Continued)

(52) U.S. Cl.
CPC ............... *B23K 9/095* (2013.01); *B23K 9/0956* (2013.01); *B23K 9/1276* (2013.01);
(Continued)

(58) Field of Classification Search
CPC .... B23K 9/095; B23K 9/0956; B23K 9/1276; B23K 31/125; G01S 13/881; G01S 13/36; G01S 7/025; G01S 13/90; Y10S 901/09; Y10S 901/42

USPC ........ 700/245, 247, 250, 253, 257, 258, 259, 700/262; 318/568.11, 568.12, 568.13, 318/568.16, 568.17, 577; 901/9, 42; 342/146

See application file for complete search history.

(56) References Cited

U.S. PATENT DOCUMENTS

| | | | |
|---|---|---|---|
| 3,775,582 A | 11/1973 | Iceland | |
| 4,204,146 A * | 5/1980 | Peiffert | B23Q 15/24 318/16 |

(Continued)

FOREIGN PATENT DOCUMENTS

| | | |
|---|---|---|
| DE | 101 04 610 | 8/2002 |
| EP | 1 094 913 | 10/2003 |

(Continued)

OTHER PUBLICATIONS

Schrattenecker et al, Accuracy Limits of a Seam-Tracking Algorithm for Microwave Systems at MM-Wave Frequencies, Proceedings of the 21st European Signal Processing Conference (EUSIPCO) 2013, IEEE, Sep. 9-13, Marrakech, Morocco, pp. 1-5.*

(Continued)

*Primary Examiner* — Jaime Figueroa
(74) *Attorney, Agent, or Firm* — Collard & Roe, P.C.

(57) ABSTRACT

A method for positioning a welding head or welding torch of a robot welding system over a workpiece sends microwaves as a measuring signal from a transmitter arranged on the welding head to the workpiece. The microwaves reflected on the workpiece are received by at least one receiver arranged on the welding head, and the received microwaves are evaluated by an evaluation module for determining the position of a workpiece edge. The microwaves are sent from at least one transmitter in different positions on the welding head, and the reflected microwaves are received, with a change of polarization, by the at least one receiver, having a polarization plane arranged at an angle to the polarization plane of the transmitter. The position of the edge is determined by the evaluation module at least on the basis of a phase change of the respective microwaves reflected on the different positions.

10 Claims, 3 Drawing Sheets

(51) Int. Cl.
*B23K 9/127* (2006.01)
*B23K 31/12* (2006.01)
*G01S 13/88* (2006.01)
*G01S 7/02* (2006.01)
*G01S 13/36* (2006.01)
*G01S 13/90* (2006.01)

(52) U.S. Cl.
CPC .............. *B23K 31/125* (2013.01); *G01S 7/025* (2013.01); *G01S 13/36* (2013.01); *G01S 13/881* (2013.01); *G01S 13/90* (2013.01); *Y10S 901/09* (2013.01); *Y10S 901/42* (2013.01)

(56) References Cited

U.S. PATENT DOCUMENTS

| | | | |
|---|---|---|---|
| 4,326,155 A | 4/1982 | Griebeler | |
| 4,459,526 A * | 7/1984 | Griebeler | 318/576 |
| 4,724,302 A * | 2/1988 | Penney et al. | 219/130.21 |
| 4,965,499 A * | 10/1990 | Taft et al. | 318/568.11 |
| 5,537,876 A * | 7/1996 | Davidson | G01N 29/041 228/104 |
| 6,249,718 B1 * | 6/2001 | Gilliland et al. | 700/255 |
| 6,362,456 B1 * | 3/2002 | Ludewig et al. | 219/124.34 |
| 6,504,383 B1 * | 1/2003 | Hillenbrand | G01S 13/88 324/637 |
| 7,006,958 B2 * | 2/2006 | Crilly et al. | 703/7 |
| 7,055,388 B2 | 6/2006 | Arndt et al. | |
| 7,539,603 B2 * | 5/2009 | Subrahmanyam | 703/6 |
| 8,134,526 B2 | 3/2012 | Kuwata et al. | |
| 2005/0006363 A1 * | 1/2005 | Hsu | B23K 9/0953 219/130.01 |
| 2005/0252897 A1 * | 11/2005 | Hsu | B23K 9/0953 219/130.01 |

FOREIGN PATENT DOCUMENTS

| | | |
|---|---|---|
| JP | S52-50748 A | 4/1977 |
| JP | H2-184705 A | 7/1990 |
| JP | 2004-12367 A | 1/2004 |
| JP | 2007-121043 A | 5/2007 |
| JP | 2008-139687 A | 6/2008 |
| JP | 2009-192359 A | 8/2009 |
| SU | 713 666 | 2/1980 |

OTHER PUBLICATIONS

English translation of Japanese Office Action in JP 2013-554745, 2014.
International Search Report of PCT/AT2012/000133, Sep. 20, 2012.
Austrian Search Report dated Mar. 6, 2012 in Austrian Application No. A 676/2011 with English translation of the relevant parts.
Umeagukwu C. et al., "Robotic Acoustic Seam Tracking: System Development and Application," IEEE Transactions on Industrial Electronics, IEEE Service Center, Piscataway, NJ, USA, vol. 36, No. 3, Aug. 1, 1989, pp. 338-348, XP000047823. (ISR—category "A").
Kusch M. et al., "Anwendungsmöglichkeiten der Radarsensorik beim Metall-Schutzgasschweissen," Schweissen and Schneiden, DVS Verlag, Dusseldorf, Germany, vol. 60, No. 1, Jan. 1, 2008, pp. 24, 26-28, XP001518260. (ISR—category "A").

* cited by examiner

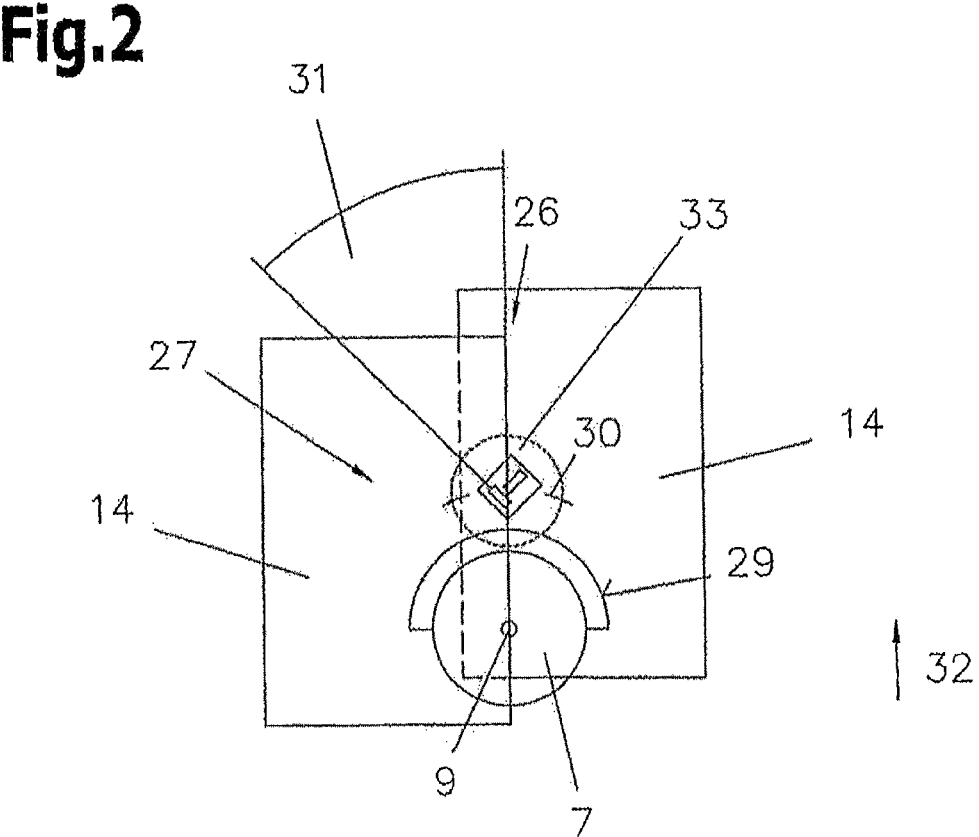
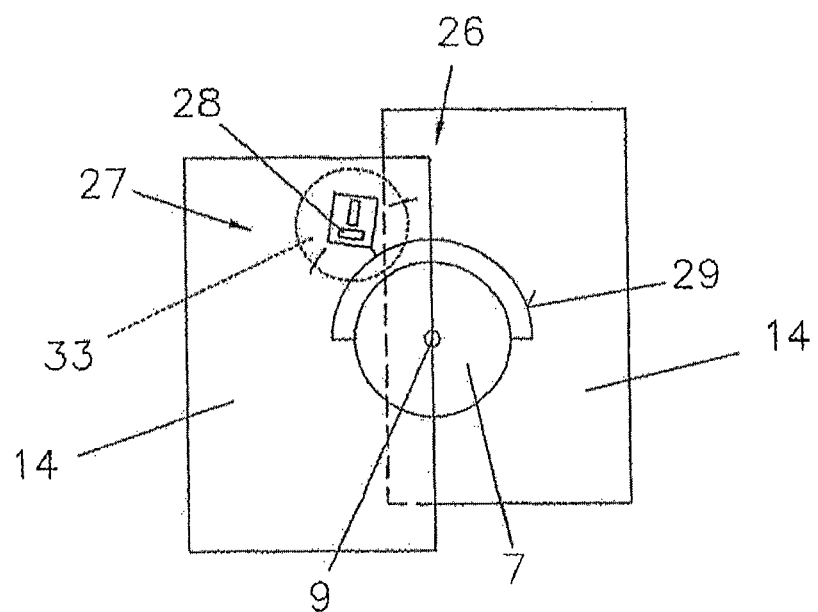

METHOD FOR POSITIONING A WELDING HEAD BY MEANS OF MICROWAVES

CROSS REFERENCE TO RELATED APPLICATIONS

This application is the National Stage of PCT/AT2012/000133 filed on May 11, 2012, which claims priority under 35 U.S.C. §119 of Austrian Application No. A 676/2011 filed on May 12, 2011, the disclosures of which are incorporated by reference. The international application under PCT article 21(2) was not published in English.

The invention relates to a method for positioning a welding head of a robot welding system over a workpiece, wherein for the position determination a measuring signal is sent in the form of microwaves from a transmitter arranged on the welding head to the workpiece, and the microwaves reflected on the workpiece are received by at least one receiver arranged on the welding head, and the received microwaves are evaluated by an evaluation module for determining the position of an edge of the workpiece.

The positioning of devices for thermal joining and cutting is essential for the quality of the joint or the cutting procedure, and the positioning has to be done under conditions of smoke, spattering, high temperatures, high-level UV radiation, electromagnetic fields etc.

Appropriate sensors are required for positioning, with radar sensors being relatively insusceptible to the conditions mentioned above. Radar sensors are used in welding methods for measuring the geometry of the seams or detecting edges by performing a continuous wave (CW) measuring for determining required changes of the distance.

In this case the radar sensors irradiate an area of typically several centimeters in diameter by means of an antenna. This will lead to the reflected wave, which is received by the antenna, constituting a lay-over of the reflections occurring in the illuminated area. As a consequence, a lay-over is present at the receiving antenna all the time, so changes of the distance are heavily blurred and determining the position is made more difficult. Tracking a welding seam of butt joints, in particular, is impossible by measuring the distance, since in actual applications the width of the gap is much smaller than the diameter of the illuminated area of the component, so it disappears in the noise due to averaging.

According to EP 1 094 913 B1, a radar sensor having an antenna working as a transmitter and a receiver is described as an example for monitoring the welding seams in a welding process. Since the radar sensor is arranged downstream, it cannot be used for the tracking of seams. Furthermore, the radar sensor is exposed to high thermal stresses due to its arrangement above the hot welding seam. Moreover, the accurate measuring of the seam's geometry requires a very broad signal bandwidth.

In general, narrow-band continuous wave (CW) radar systems are disadvantageous because, on the one hand, they cannot be used to obtain absolute information about the distance and, on the other hand, they need to be strongly focussed in order to provide a high spatial resolution.

A disadvantage here is that the use of narrow-band signals will make the systems exhibit an increased sensitivity to perturbation by undesired reflections, and that the necessary focussing requires the use of expensive and large antennae. The relative movement that is necessary requires an additional driving unit for generating the oscillation of the sensor.

Therefore, absolute measuring is not possible by means of a narrow-band CW radar signal.

If the geometry is determined solely by a measuring of the distance, i.e. a scanning process, it is not possible to focus the radiation of the radar sensors' microwaves strong enough. As a consequence, the limited resolution capabilities—which are due to the maximum possible frequency and the wavelength resulting from it—will lead to the information about the distance being blurred and, consequently, an inaccurate determination of the geometry of the edge and/or the position of the edge.

Therefore, it is the object of the invention to create a method for tracking seams as mentioned above which during a welding process is perturbation-insensitive and provides high accuracy. Drawbacks of the prior art are to be reduced and/or avoided.

The object of the invention will be achieved by a method as mentioned above, wherein the microwaves are sent from at least one transmitter in different positions on the welding head, and the reflected microwaves are received, with a change of polarisation, by at least one receiver arranged on the welding head, having a polarisation plane arranged at an angle to the polarisation plane of the transmitter, and the position of the edge is determined by the evaluation module at least on the basis of a phase change of the respective microwaves reflected at the different positions. By evaluating the polarisation of the reflected microwaves, the edge of the workpiece, i.e. the transition from the conductive and/or reflective background to the insulating environment and/or the air, may be distinguished, allowing for a reliable detection of the edge of the workpiece. The method for positioning and/or measuring is particularly suited for distinguishing the edge of the workpiece from the electrically conductive background, since the change of polarisation is mainly effected by the edge. By arranging the transmitter and the receiver at an angle to each other, the evaluation of the signal may be considerably simplified, since the electrically conductive background may be already distinguished from the desired measuring signal via the arrangement of the antennae.

Advantageously, at least one transmitter-receiver pair is arranged on the welding head or the welding torch, with a transmitter and a receiver being arranged at an angle of 90° to the other transmitter and receiver. Such an orthogonal arrangement of linearly polarising antennae, i.e. an angle of 90° between the transmitter antenna and the receiver antenna, provides for only those portions of the reflected microwaves having a changed polarisation being received.

According to another feature of the invention, transmitter and receiver are moved around the welding head together in a linear or radial manner, and a measuring signal is sent and received at defined measuring positions. The movement of the transmitter and the receiver spans a synthetic aperture transverse to the detected edge of the workpiece. The measurements of spatially different positions may be used for the position determination of the edge by evaluating the profile of the phases in the measured signal, which is triggered by the movement. This makes it possible to detect the position of the edge of the workpiece very accurately.

In addition to the position, a direction of the edge of the workpiece may be identified as well, at least by means of an amplitude of the microwaves that are reflected at the measuring positions. The change of polarisation, which is caused by the edge of the workpiece, depends on the polarisation of the incoming microwave, so this information can be used to find the orientation of the edge. The direction of the edge can only be detected reliably via a polarimetric evaluation.

In addition to position and direction of the workpiece the width of the gap between the workpieces to be welded together can be determined. An advantage for determining the width of the gap is knowing the thickness of the workpiece. If the radar antenna is moved over the workpieces to be welded with the transmitter and the receiver having the same polarisation, the distance-dependent phase makes it possible to identify the profile of the distance, so if the thickness of the sheet metal is known, the width of the gap between the workpieces can be derived.

Advantageously, at least one transmitter and one receiver are arranged in the different measuring positions, with the measuring signal being sent by a transmitter and the reflected measuring signal being received and evaluated by at least one receiver at a measuring position that is arranged at an angle thereto.

The transmitter in the individual measuring positions arranged around the welding head may be activated in succession, with the reflected measuring signals always being received and transferred to the evaluation module for the position determination by at least one receiver.

Ideally, the type of the welding task, such as butt joint for I-weld, butt joint for V-weld, lap joint or T-joint for fillet weld, is set for the position determination by means of an input and/or output device. This makes it possible to identify the present parameters (position, orientation, gap etc.) on the basis of the best match. Knowing the geometry makes it possible to calculate the expected reflections depending on the position and orientation of the radar antennae as well as the position of the welding task.

According to the welding task entered, a stored model, which is designed in the form of a stored measuring signal or a stored form for calculating the model, may be retrieved in order to be compared to the received measuring signals by means of the evaluation module. By comparing the model to the measured measuring signals, the ideal parameters that best describe the position can be determined.

Advantageously the evaluation module uses the power and/or intensity of the received measuring signal to determine a rough positioning of the welding head with respect to the workpiece.

The object according to the invention is also achieved by a method for the model-supported positioning of a welding head of a robot welding system, wherein the evaluated measuring signal is transferred from the evaluation module to a model calculation module, and a stored model containing a plurality of defined parameters is activated by the model calculation module, said model being selected by means of seam geometry entered by an input and/or output device, and the calculated model is compared to the evaluated measuring signal by modifying pre-defined parameters until a defined congruence is available.

The present invention will be discussed in more detail by means of the attached schematic drawings. In the drawings:

FIG. 2 shows a schematic representation of the antenna system according to the invention on the welding head, positioned in front of a workpiece;

FIG. 3 shows a schematic representation of the antenna system with a torsion angle to the edge of the workpiece;

Figure 1:
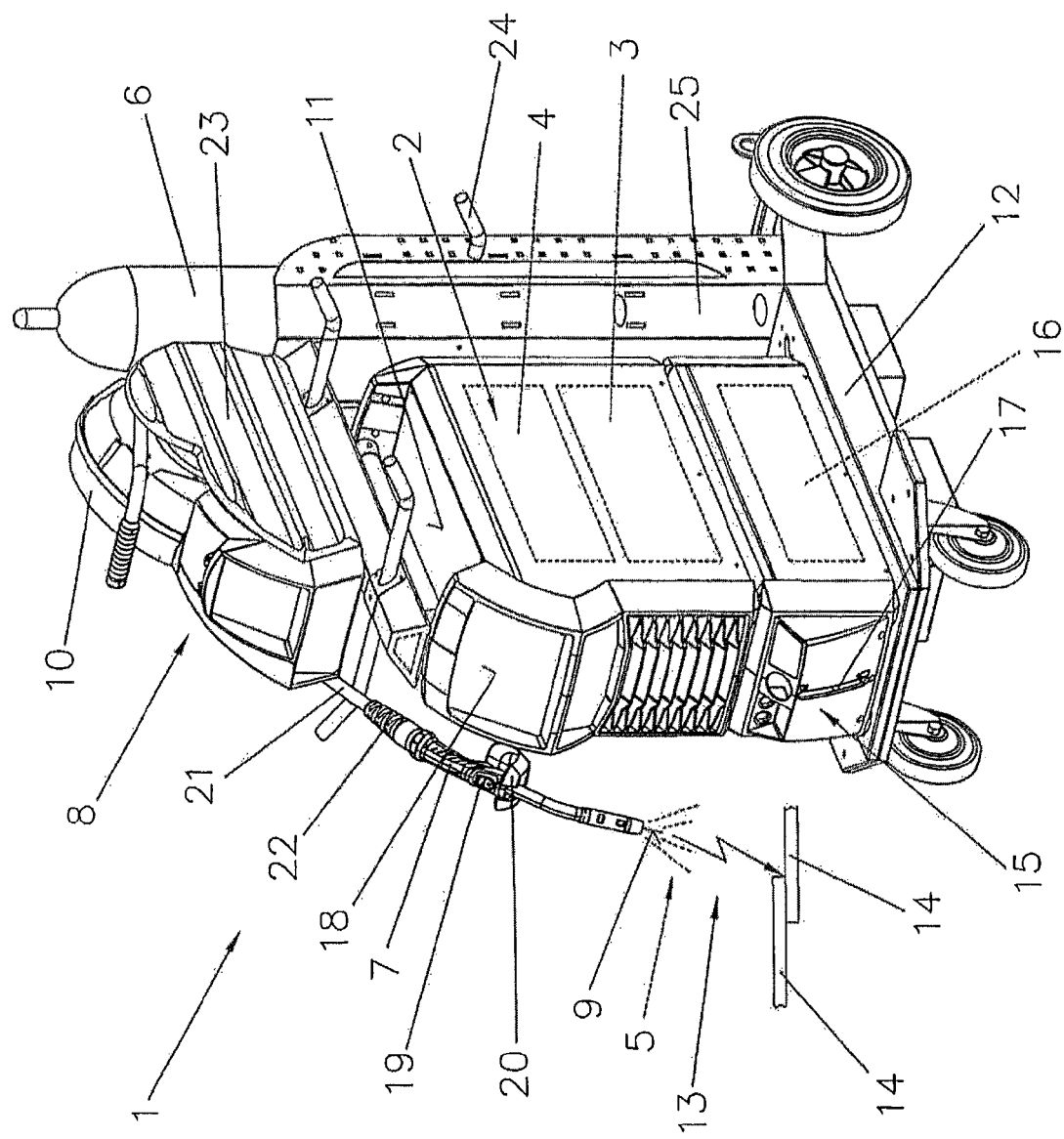
FIG. 1 shows a schematic representation of a welding device.

FIG. 1 shows a welding device 1 for many different processes and/or methods such as MIG/MAG welding and/or TIG welding or electrode welding operations, double-wire/tandem welding operations, plasma operations or brazing and soldering operations etc. The welding device 1 comprises a power source 2 with a power element 3 arranged therein, a control unit 4 and further components and wires (not shown) such as a switching member, control valves etc. The control unit 4 may be connected to a control valve that is arranged between a gas storage 6 and a (welding) torch 7 in a supply line for a gas 5, in particular a shielding gas such as $CO_2$, helium or argon and the like. In addition, the control unit 4 may be used to control also a wire feed unit 8 as it is common for MIG/MAG welding, with an additional material and/or welding wire 9 being supplied to the region of the welding torch 7 from a supply roll 10 and/or a wire coil via a supply line. Of course it is possible for the wire feed unit 8 to be integrated into the welding device 1, in particular into the housing 11 of the power source 2, in contrast to being an additional device positioned on a cart 12, as illustrated in FIG. 1. Moreover, it is also possible for the wire feed unit 8 to be placed directly on top of the welding device 1, i.e. the housing 11 of the power source 2 is formed for receiving the wire feed unit 8 on the top surface so that the cart 12 can be omitted.

It is further possible for the wire feed unit 8 to supply the welding wire 9 outside of the welding torch 7 to the process site, in which case a non-melting electrode is preferably arranged within the welding torch 7, as is common in TIG welding.

The current for creating an electric arc 13 between the electrode and/or the welding wire 9 and a workpiece 14 is supplied by the power element 3 of the power source 2 to the welding torch 7, in particular to the electrode and/or the welding wire 9, via a welding line (not shown), with the workpiece 14 to be welded being connected to the power source 2 via a further welding line for the further potential, in particular the return lead, so that an electric circuit can be created by means of the arc 13.

For cooling the welding torch 7, it may be connected to a liquid tank, in particular a water tank 16 with a level indicator 17, via a cooling device 15 and possible intermediate components such as a flow controller. The individual components of the welding installation, i.e. the power source 2, the wire feed unit 8 and the cooling device 15, are formed in such a way that they have corresponding protrusions and/or recesses so they can be stacked or placed on top of each other safely.

The welding device 1, the power source 2 in particular, further comprises an input and/or output device 18 for setting and/or retrieving and displaying all the various welding parameters, operation modes or welding programmes of the welding device 1. The welding parameters, operation modes or welding programmes that have been set by the input and/or output device 18 are communicated to the control unit 4, which then actuates the individual components of the welding device 1 and/or defines appropriate set points for regulating or controlling. Here, it is also possible to perform setting procedures via the welding torch 7 when using an appropriate welding torch 7, in which case the welding torch 7 is equipped with a welding torch input and/or output device 19. In this case, the welding torch 7 is preferably connected to the welding device 1, in particular the power source 2 or the wire feed unit 8, via a data bus, in particular a serial data bus. For starting the welding process, the welding torch 7 usually comprises a starting switch (not shown), so the arc 13 can be ignited by actuating the starting switch. In order to protect the user from the great heat radiation of the arc 13, the welding torch 7 may be equipped with a heat protection shield 20.

Moreover, in the exemplary embodiment shown, the welding torch 7 is connected to the welding device 1 via a hose pack 21, said hose pack 21 being attached to the welding torch 7 by an anti-buckling means 22. In the hose pack 21, the individual lines such as the supply line and/or lines for the welding wire 9, for the gas 5, for the cooling circuit, for the data transmission etc. are arranged from the welding device 1 to the welding torch 7 while the return lead is preferably connected to the power source 2 separately.

In general, it should be noted that for the different welding operations and/or welding devices 1, such as TIG devices or MIG/MAG devices or plasma devices, not all components mentioned above have to be used and/or incorporated. It may, for example, be possible for the welding torch 7 to be formed as an air-cooled welding torch 7 so the cooling device 15, for example, might be omitted. As a consequence, it can be said that the welding device 1 is formed by at least the power source 2, the wire feed unit 8 and the cooling device 15, which can also be arranged in a common housing 11. Furthermore, it is possible for further parts and/or components such as a drag protection 23 on the wire feed unit 8 or an optional carrier 24 on a holder 25 for the gas storage 6 etc. to be arranged and/or included.

According to the invention, it can be seen in FIGS. 2 to 7 together that a measuring signal is sent by at least one transmitter in different positions at the welding head or welding torch 7, and that the reflected measuring signal is received by at least one receiver arranged on the welding torch 7. The polarisation plane of the receiver is arranged at an angle to the polarisation plane of the transmitter. Finally, an evaluation module will perform an evaluation for determining a position and an orientation of an edge 26 of the workpiece 14 along which the welding process is carried out. Thereby, information about the profile of the geometry that is to be welded immediately—i.e. the tracking of a seam—may be made available to the welding robot. Abrupt corrections of the welding robot will also be avoided that way.

Preferably, antennae 28 which can serve as transmitters as well as receivers, thus constituting a transmitter-receiver unit, are used for sending the waves. For example, linearly polarised antennae 28 may be employed. Since a receiver is arranged at an angle to the transmitter, at least two transmitter-receiver units are required for an antenna system 27 on the welding head or welding torch 7. Hereinafter transmitter-receiver units will be referred to as antennae 28. By this arrangement, a receiver can receive the wave reflected from the workpiece 14, which has a different polarisation than the sent wave. This change of the polarisation of the wave will be effected by the edge 26 of the workpiece 14, which represents a transition from an electrical conductor (workpiece) to an electrical non-conductor (e. g. air). Due to the sent wave, an electrical field hitting the electrically conductive workpiece 14 is formed, so a corresponding current density occurs on the workpiece 14. The direction of the induced current depends on the polarisation plane of the sent wave and the distribution of the specific conductivity of the material of the workpiece 14. This means that, as a transition between an electrical conductor and an electrical non-conductor, the edge 26 of the workpiece has an effect on the direction of the current density. The polarisation of the reflected wave is thus dependent on a torsion angle 31 between the edge 26 of the workpiece 14 and the polarisation plane of the sent wave (FIG. 2).

If the sent wave is sent with a polarisation plane that is parallel to the edge 26 of the workpiece, i.e. with a torsion angle 31 of 0°, the polarisation of the reflected wave is not changed. If the sent wave has a polarisation plane with a torsion angle 31 of above or below 0°, the intensity of the incoming field and the propagation of the induced current density are different in close vicinity of the edge 26, since at the location of the edge 26 the induced current density can substantially propagate along the edge 26 only. As a consequence, the direction of the intensity of the incoming electrical field is different from that of the current density in the region of the edge 26. This influence on the direction depends on the torsion angle 31 between the edge 26 and the polarisation plane of the sent wave. This means that the polarisation of the reflected wave is changed if the profile of the edge 26 is different from the polarisation of the sent wave and the torsion angle 31 is not 90°. The torsion angle 31 is defined with respect to the edge 26 of the workpiece 14 by the orientation of the antenna which sends the wave and defines its polarisation. For this, the antenna system 27 may be moved along a guiding rail 29 arranged on the welding torch 7, which defines the direction of movement 30. These movements of the antenna system 27 may be linear or radial and/or along a circular path around the welding torch 7, i.e. substantially transverse to the edge 26.

In order for the receiver to receive only the reflected waves having a changed polarisation and not the waves having the polarisation of the transmitter, the polarisation plane of the receiver antenna is arranged and/or oriented in a substantially orthogonal way, i.e. at an angle of 90° to the polarisation plane of the transmitter (transmitter antenna). The reflected waves having the polarisation of the transmitter, however, will be received by the transmitter antenna.

This means that the waves sent by the first antenna 28 are reflected by the workpiece 14 and received by the first antenna 28 and the second antenna 28, with the receiver of the second antenna 28 receiving the wave portion having a changed polarisation and the receiver of the first antenna 28 receiving the wave portion having an unchanged polarisation. Accordingly, this does also apply vice versa, so the first antenna 28 receives the wave of the transmitter signal of the second antenna 28, which is reflected having a changed polarisation, and the second antenna 28 receives the wave portion having the same polarisation as before.

In this way, the waves reflected by the workpiece 14 are received as waves that have been separated according to changed and unchanged polarisation.

The antenna system 27 according to this embodiment, which is formed by at least two antennae 28 arranged orthogonally to each other, makes it easy to determine position, orientation and geometry data (such as the air gap between the parts of the workpiece 14, for example) of the edge 26 and thus the profile of the metal edge 26 to be welded. For an accurate determination of the position and orientation of the edge 26 the antenna system 27 may also be moved around the welding head 7, consequently changing the torsion angle 31 between antenna system 27 and edge 26 and triggering "crosstalk" of the reflected waves between the receivers. This "crosstalk" is caused by the distribution of the reflected waves that has been described above. Here, the angle to the antenna 28 which receives the reflected wave having a changed polarisation remains unchanged and is substantially 90°. By means of evaluating the wave portions that have been received in the respective receivers, which result from the "crosstalk" at least to a certain part, it is possible to detect the orientation and the position of the edge 26 in the "crosstalk".

The rotational movement of the antenna system 27 in a direction of movement 30 above the workpiece 14 makes the antenna system 27 assume different measuring positions around the welding torch 7 and/or the welding head. At these measuring positions, the reflective behaviour of the workpiece 14 at different frequencies is recorded and stored in order to improve the stability of the measuring method. For this, a wave is sent from every measuring position, with its polarisation changing according to the torsion angle 31 of the measuring positions. Accordingly, the distribution and the polarisation of the reflected wave change as well, thus leading to fluctuations in the intensity of the "crosstalk".

In this case, the intensity of the reflected wave having a changed polarisation is significantly lower than that of the sent wave. This is the reason why it is favourable to orient the receiver antenna orthogonally to the transmitter antenna in order to guarantee that no crosstalk can occur with any portion of the sent wave with its high intensity and original polarisation. This also makes it possible to adjust the amplifier stages in the evaluation module to the lower intensity.

Advantageously, the measuring positions are substantially arranged on a semi-circle that is located in a symmetrical way with respect to the edge 26, so the measuring positions are on quarters of circles to the left and to the right of the edge 26. This makes it possible for the evaluation module to find the measuring position that corresponds to the position and orientation of the edge 26, from the stored reflective behaviours of the different measuring positions. Of course it is possible to perform, for example, an interpolation between the measuring positions, deriving the position and the orientation of the edge 26 from the interpolated measuring position.

Via various constructions the antenna system 27 can perform the measurements at different measuring positions. In addition, the antenna system 27 may be moved in a rotational manner in order to increase the number of measurements.

In a first embodiment, the antenna system 27 may form an assembly in which two antennae 28, preferably offset by 90°, are arranged as has already been described above. With this arrangement the entire assembly is moved around the welding torch 7 or multiple assemblies are arranged around the welding torch 7 and/or the arc component and/or the welding head, with the torsion angle 31 being changed and the maximum "crosstalk" being adjustable.

Figure 4:
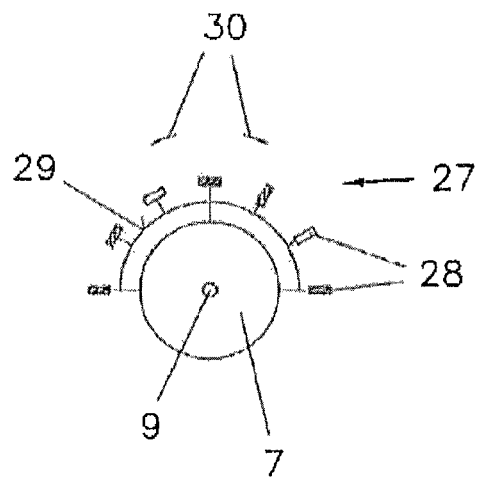
FIG. 4 shows a schematic representation of a second embodiment of the antenna system.
Figure 5:
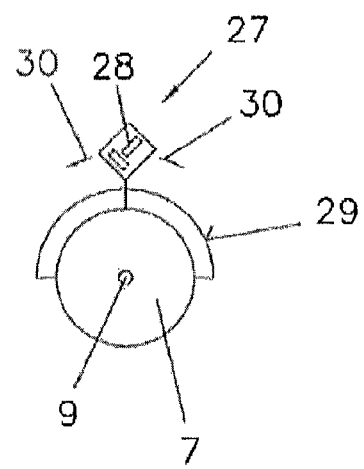
FIG. 5 shows a schematic representation of a third embodiment of the antenna system.

In a second embodiment according to FIG. 4, the antenna system 27 is composed of multiple antennae 28, with every antenna 28 being usable as a transmitter-receiver unit. Here the antennae 28 are arranged around the welding torch 7 at a defined distance and/or angle to each other. Substantially, every antenna 28 is associated to a corresponding antenna 28 that is offset by 90°. In the example, seven antennae 28 are arranged on a semi-circle, each offset by 30°. Two corresponding antennae 28 are always activated at the same time. Moving the antennae 28 is recommended, but not necessarily required here as well. In order to provide the required measuring positions, any number of antennae 28 may be used in such an arrangement.

In a third embodiment, the reflected wave having a changed polarisation may be received by electrically changing the torsion angle 31 of the antenna 28 at a measuring position. Here, the reflected waves are received with the polarisation of the sent wave as well as with the changed polarisation of the reflected wave. For this, the receiver of the antenna 28 comprises two outputs, so the reflected waves having different polarisations can be evaluated. According to FIG. 5 this is illustrated by an antenna 28 drawn by a dashed line, which is physically non-existent, since the switching of the polarisation is implemented electrically. A circular waveguide, for example, is used as the antenna 28 here. The antenna 28 is moved around the welding torch 7 in such a way that a rotation of the antenna 28 around its own axis and a movement transverse to the edge 26 and/or a rotation around the welding torch 7 is performed.

The antennae 28 generate electromagnetic waves that irradiate, depending on the frequency and the shape of the antenna, an area of the workpiece 14 which is much larger than the required resolution and/or accuracy of the seam tracking system. At a frequency of 77 GHz, for example, the minimum possible diameter of the area with 98% of the radiation energy is approx. 1.5 cm. For the process, however, a resolution in the sub-millimeter range (e.g. 0.1 mm) is required, which is achieved by the evaluation of the change of the polarisation and measurements at multiple spatial positions. The required focussing on a few wavelengths can be achieved by setting frequency and diameter appropriately. If the sent wave hits a planar surface of the workpiece 14 instead of the edge 26, the reflected wave will have the same polarisation as the sent wave.

At an edge 26 of the workpiece 14, however, the polarisation of the reflected wave is changed in comparison to the sent wave. This change of the polarisation results from the torsion angle 31 between edge 26 and polarisation plane and can be received by the angular arrangement of transmitter and receiver. Accordingly, only reflected waves having a reversed polarisation are received by that antenna 28 of the receiver which is arranged at an angle to the antenna 28 of the transmitter.

In the evaluation, the different reflective behaviours that have been recorded with the different measuring positions are combined, and the position and orientation of the edge 26 as well as geometry data, such as the width of the gap, are determined on this basis. The measuring position may be changed, for example, every 2 ms. The forward movement of the welding torch 7 has only little effect on the measurements here.

The profiles of the amplitudes and phases of the reflected waves are observed in dependence on the position and the polarisation plane. Depending on the distribution of the directions of the currents at the different measuring positions, the individual waves are reflected having different amplitudes and phases. According to this, position (phase) and direction (amplitude) can be identified by an evaluation of amplitudes and phases of the reflected waves.

By moving the antenna system 27 via the direction of movement 30, the radiation area 33 (illuminated area) is displaced, so the position of the edge 26 in the irradiated area, i.e. the illuminated area, is displaced with respect to the edge 26 as well. Accordingly, the intensity of the received waves also changes, depending on the torsion angle 31 to the edge 26. The change of the torsion angle 31 leads to a change of the distribution of the wave propagation and thus to a change of the amplitude of the reflected wave. According to the antenna system 27, transmitter and receiver of two different antennae 28 are offset by 90° to each other, so if the antenna system 27 is moved substantially in a semi-circle, the torsion angle 31 may be between −90° and +90°.

If the edge 26 of the workpiece 14 is on the 0° line of the semi-circle, one antenna 28 is also arranged on the 0° position, and the second antenna 28 is arranged on the −90° position or the +90° position. In this case the polarisation of the waves remains substantially unchanged, since no change of the polarisation occurs due to the flush alignment of the transmitter and the edge 26. The torsion angle 31 is 0° here.

Figure 6:
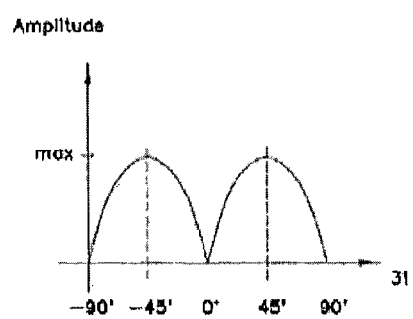
FIG. 6 shows an evaluation of the amplitude of the reflected waves of the antenna system.

If, however, every antenna 28 is oriented towards the edge 26 at a torsion angle 31 of 45°, i.e. one antenna 28 at 45° and the second antenna 28 at −45°, the change of the polarisation will effect a maximum amplitude of the reflected wave, as is illustrated in the amplitude diagram according to FIG. 6.

Consequently, the direction of the edge 26 can be determined unambiguously via polarimetric evaluation due to the different amplitudes of the reflected waves. The evaluation module identifies the direction at least from the measuring positions having the maximum amplitudes by using the measuring position in the centre between these two measuring positions, for example, as measurement for the direction. Of course the profile of the amplitude between the measuring positions may also be interpolated, so a position on the interpolated profile may be considered as measurement for the direction as well.

Figure 7:
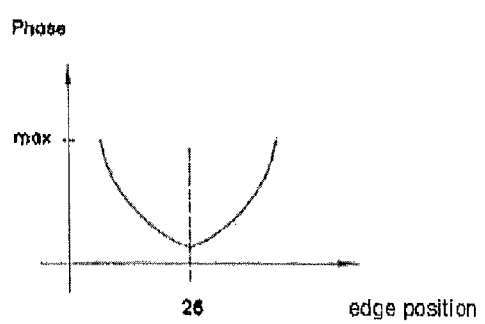
FIG. 7 shows an evaluation of the phase of the reflected waves of the antenna system.

The position of the edge 26, on the other hand, is identified by means of the profile of the phase of the reflected wave, as has already been mentioned and can be seen in FIG. 7. Accordingly, the phase of the reflected wave is captured and stored at every measuring position, so the phase change between the measuring positions can be evaluated. Here, a phase change occurs at the edge 26, since the distance changes because of the different measuring positions and the reflected wave is thus received with a delay in time. This change does, however, not occur abruptly, but progresses according to a curve, since the wave is reflected with different delays depending on the surface of the illuminated area of the individual measuring positions, so the phase changes together with the position of the edge 26 in the illuminated area. The phase of the reflected wave has its minimum value when the edge 26 is in the central region of the illuminated area.

In the polarimetric evaluation, the minimum can be identified from the stored phase values, and from this, the position of the edge 26 can be determined by associating the minimum identified by the evaluation module to a measuring position. Of course a monostatic evaluation may be employed instead of or in addition to the polarimetric evaluation as well.

In order to speed up the evaluation and/or obtain the change of the polarisation faster, the antenna system 27 is preferably arranged at a torsion angle of 45° with respect to the edge 26—in particular according to FIG. 2. This prevents the polarisation of the reflected wave from not being changed. Likewise, the type of the welding task (such as butt joint for I-weld, butt joint for V-weld, lap joint or T-joint for fillet weld) can be set for the position determination by means of an input and/or output device 19 of the welding device 1. This allows for a faster evaluation since the expected reflected waves make it possible to associate the reflected waves faster and easier.

Due to the combined translational and rotational movements of the antennae 28 around the welding torch 7 (FIG. 2), the edge 26 of the workpiece 14 is irradiated by the sent wave from different polarisation directions at a measuring position, and the reflected waves are captured. For this, the torsion angle 31 at a measuring position is changed by twisting the antenna 28. This additional movement of the antenna increases the accuracy of the measurements per measuring position and, accordingly, the result of the evaluation module.

On the basis of the evaluation of the position and the direction of the edge 26 of the workpiece, a correction of the position of the welding torch 7 and/or the welding head may be performed, if applicable. In terms of the construction, a central point of the antenna system 27 is aligned flush with a central axis of the welding torch 7, so the associated measuring position has to be flush as well for a correct positioning of the welding torch 7. For this, a required distance for changing the position of the welding torch 7 is determined via the difference of the angle between the measuring position and the central point to the torsion angle 31. By using this evaluated position and direction, the welding robot can be positioned exactly at the edge 26, with the deviations in the welding direction 32 until the next measuring cycle being kept at a minimum by means of the direction identified.

In order to detect, for example, undesired gaps between the workpieces 14 to be welded as well, and in order to adapt the parameters of the welding process accordingly, accurate information about the height is required. According to the invention, this information can be calculated by a mathematical model, which varies the parameters in order to simulate the result measured and/or provided by the evaluation module, so the geometry of the gap can be identified. A preselected seam geometry serves as the basis for this, so a simulation result, which is stored together with it, is already similar to the evaluated result. By varying the parameters accordingly, the results are approximated. The model may also link several measurements to each other and determine the width of the gap in this way, for example.

In the model, the reversing effects on the polarisation of the waves are captured via local current densities along the edge 26 of the workpiece 14, so a model-based detection of the edge 26 is possible.

According to the invention, it is also possible to train the model for complex geometries. To do so, the decisive parameters for the welding process (such as edge position, width of the gap etc.) are varied and measured. For this, the antenna system 28 is moved above the geometry, and the reflections are captured as measurement data. If the geometry is changed, the reflections change as well. The obtained measurement data may be stored as a pattern of reflections in a memory.

During operation, the current measurement data may be compared to the patterns of reflections in the memory to derive the current parameters. Because of the additional effort required for such a training procedure and because of the high memory requirements, however, the training procedure is only useful for complex geometries that would make the development of a mathematical model too labour-intensive.

The fact that every antenna 28 used as a transmitter may also be used as a receiver is exploited for enabling a rough positioning at the joint of the workpiece 14. To do so, the radiation power of the sent wave and the radiation power of the received wave are monitored and compared. Knowing the radiation power that is received by the transmitter antenna, the radiation power received by the receiver antenna can be scaled correctly in order to avoid evaluation errors. It goes without saying that the radiation power may also be monitored when using separate transmitter and receiver antennae.

The antenna system 27 may also be used for adjusting the TCP (tool centre point) of the welding system. For this, the TCP of the welding system is adjusted, for example, after replacing a consumable of the welding head 7 by performing a calibration run of the welding robot over known geometries of the workpieces 14 (such as lap joint, T-joint, fillet weld etc.) with different densities of workpieces and widths of gaps, recording corresponding measurements for position, direction and geometry by the antenna system 27. The TCP may be set based on these measurements.

The invention claimed is:

1. A method for positioning a welding head of a robot welding system over a workpiece during a welding process, the method comprising steps of:
   sending a first measuring signal in the form of first microwaves from a first transmitter arranged in a first position on the welding head to the workpiece such that the first microwaves are reflected by the workpiece, the first transmitter having a first transmitter polarization plane,
   receiving via a first receiver arranged on the welding head the reflected first microwaves, the reflected first microwaves having a change in polarization, and the first receiver having a first receiver polarization plane arranged at an angle to the first transmitter polarization plane, sending to the workpiece a second measuring signal in the form of second microwaves from the first transmitter arranged in a second position on the welding head or from a second transmitter arranged in a second position on the welding head, such that the second microwaves are reflected by the workpiece, when the first transmitter has a second transmitter polarization plane or when the second transmitter has a second transmitter polarization plane, receiving via the first receiver arranged on the welding head or via a second receiver arranged on the welding head the reflected second microwaves when the first receiver has a second receiver polarization plane arranged at an angle to the second transmitter polarization plane or when the second receiver has a second receiver polarization plane arranged at an angle to the second transmitter polarization plane, the reflected second microwaves having a change in polarization, evaluating the received first microwaves and the received second microwaves via an evaluation module to determine a position of an edge of the workpiece at least on the basis of a phase change of the respective received first microwaves and the received second microwaves, and evaluating via the evaluation module an amplitude of the reflected first microwaves and an amplitude of the reflected second microwaves to determine a direction of the edge of the workpiece, wherein the first transmitter is a transmitter-receiver antenna, wherein the first receiver is a transmitter-receiver, and wherein the transmitter-receiver antenna is arranged on the welding head at an angle of 90° to the transmitter-receiver.

2. The method according to claim 1, wherein the second measuring signal is sent to the workpiece in the form of second microwaves from the first transmitter arranged in a second position on the welding head, when the first transmitter has a second transmitter polarization plane wherein the reflected second microwaves are received via the first receiver arranged on the welding head when the first receiver has a second receiver polarization plane arranged at an angle to the second transmitter polarization plane and when the receiver is disposed at a first receiver position, and the method further comprising steps of:

moving the first transmitter from the first position to the second position in a linear or radial manner, and moving the first receiver from the first receiver position to a second receiver position in a linear or radial manner, the first receiver receiving the reflected second microwaves at the second receiver position, wherein the moving of the first transmitter and the moving of the first receiver occur together.

3. The method according to claim 1, further comprising a step of:

determining via the evaluation module a width of a gap between the workpiece and a second workpiece, wherein the workpiece is a first workpiece, and wherein the second workpiece is to be welded to the first workpiece.

4. The method according to claim 3, further comprising a step of:

entering a thickness of the workpiece.

5. The method according to claim 1, wherein the first receiver receives the reflected first microwaves when the first receiver is arranged at a first receiver position on the welding head, wherein the first receiver position is arranged at a first angle to the first position of the transmitter, wherein the first receiver or the second receiver receives the reflected second microwaves when the first receiver or the second receiver is arranged at a second receiver position on the welding head, and wherein the second receiver position is arranged at a second angle to the second position of the first transmitter or of the second transmitter.

6. The method according to claim 1, wherein the second measuring signal is sent to the workpiece in the form of second microwaves from a second transmitter arranged in a second position on the welding head such that the second microwaves are reflected by the workpiece, when the second transmitter has a second transmitter polarization plane, wherein the reflected second microwaves are received via a second receiver arranged on the welding head when the second receiver has a second receiver polarization plane arranged at an angle to the second transmitter polarization plane, and wherein the first transmitter and the second transmitter are activated in succession.

7. The method according to claim 1, further comprising a step of:

setting via an input device and/or an output device a type of a welding task to be performed via the welding head.

8. The method according to claim 7, wherein further comprising a step of:

retrieving via the evaluation module, according to the set welding task, a stored model, in the form of a stored measuring signal or a stored form for calculating the model, and comparing via the evaluation module the received first microwaves and the received second microwaves with the stored model.

9. The method according to claim 1, wherein the position of the edge of the workpiece is determined with respect to a position of the welding head, and wherein a first power of the reflected first microwaves and a second power of the reflected second microwaves are used by the evaluation module in the evaluation to determine the position of the edge of the workpiece.

10. A method for model supported positioning of a welding head of a robot welding system over a workpiece during a welding process, the method comprising steps of:

sending to the workpiece via a transmitter arranged on the welding head a measuring signal in the form of microwaves from a transmitter arranged on the welding head such that the microwaves are reflected by the workpiece, receiving via a receiver arranged on the welding head the reflected microwaves, evaluating via an evaluation module the received reflected microwaves to determine a position of an edge of the workpiece, transferring the evaluated microwaves from the evaluation module to a model calculation module, entering into an input device and/or an output device a seam geometry of a welding seam to be welded by the welding head, selecting a stored model on the basis of the geometry of the welding seam, the stored model containing a plurality of defined parameters, activating via the model calculation module the stored model, and comparing the stored model to the evaluated microwaves by modifying pre-defined parameters until a defined congruence is available.

\* \* \* \* \*

UNITED STATES PATENT AND TRADEMARK OFFICE
CERTIFICATE OF CORRECTION

PATENT NO. : 9,327,362 B2
APPLICATION NO. : 13/879888
DATED : May 3, 2016
INVENTOR(S) : Haderer et al.

It is certified that error appears in the above-identified patent and that said Letters Patent is hereby corrected as shown below:

In the Claims

In particular, in Column 12, line 35, (Line 1 of Claim 8) please delete: "wherein".

Signed and Sealed this
Fifth Day of July, 2016

Michelle K. Lee
*Director of the United States Patent and Trademark Office*